UNITED STATES PATENT OFFICE.

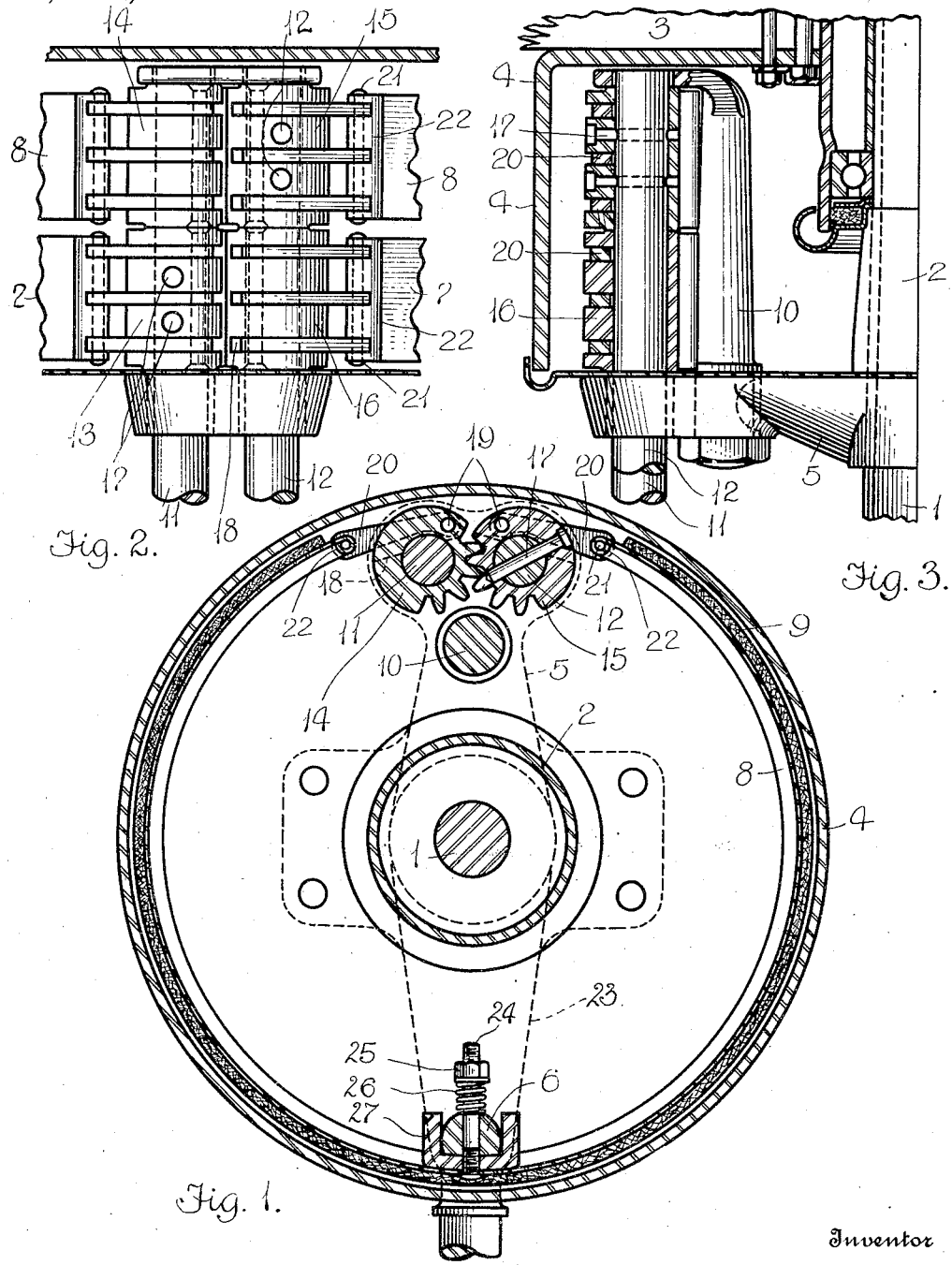

EMIL A. NELSON, OF RONVILLE, MICHIGAN.

BRAKE MECHANISM FOR MOTOR-VEHICLES.

1,211,742.

Specification of Letters Patent.

Patented Jan. 9, 1917.

Application filed December 17, 1914. Serial No. 877,652.

*To all whom it may concern:*

Be it known that I, EMIL A. NELSON, a citizen of the United States of America, residing at Ronville, in the county of Wayne and State of Michigan, have invented certain new and useful Improvements in Brake Mechanisms for Motor-Vehicles, of which the following is a specification, reference being had therein to the accompanying drawings.

This invention relates to a brake mechanism that may be advantageously used in connection with motor vehicles to provide emergency and service brakes.

My invention aims to utilize independent brake bands in connection with a brake drum or housing for controlling the operation of a rotative body relative to a stationary body and to provide positive and reliable means adapted to operate in a manner hereinafter set forth for independently and expeditiously adjusting the brake bands.

My invention further aims to furnish a compact actuating mechanism for brake bands which will insure a positive uniform movement of the band and an even gradual engagement thereof with its drum thus preventing chattering and consequent wear and insuring the gradual application of power to stop the rotating member.

My invention further aims to accomplish the above and other results by a novel construction, all as hereinafter more fully described, the invention consisting in the matters hereinafter set forth and more particularly pointed out in the claims, reference being had to the accompanying drawings, in which—

Figure 1 is a cross sectional view of a brake drum provided with a brake mechanism in accordance with my invention; Fig. 2 is a plan view of the brake band operating mechanism; and Fig. 3 is a longitudinal section through a portion of the same and adjacent parts.

In describing my invention by aid of the above views, I desire to point out that the same are merely illustrative of an example whereby my invention may be applied in practice, and I do not care to limit the invention to the precise construction and arrangement shown. The following description is therefore to be broadly construed as including substitute constructions and arrangements of parts.

In the drawing, the reference numeral 1 denotes an axle having a housing 2, a wheel 3, a brake drum 4 and a bearing arm 5 on the housing at the open end of said drum. An oppositely extending arm 23 on the housing carries an anchor bar 6 extending into the drum for holding the brake bands 7 and 8 intermediate their ends against longitudinal movement; said bands being provided with friction shoes or wear strips 9 adapted to engage the inner surface of the wall of the drum 4 and retard or eventually stop a rotary movement of the drum and the wheel 3 to which it is attached. A pin or bolt 24 secured at one end to each band extends loosely through an opening in the anchor bar 6 and is provided with a nut or head 25 on its inner end and a coiled spring 26 sleeved thereon between the head and bar to yieldingly hold the band moved toward the bar out of contact with the sleeve. A channel member 27 carried by each band embraces the anchor bar and forms a guide for the band to prevent the bolt from binding. The band is thus anchored against longitudinal movement but is free to move outward into contact with the drum against the action of said spring 26 which normally holds it away from the drum to permit the drum to turn freely.

10 denotes a bracket or bearing carried by the bearing arm 5 and extending into the drum 4 in proximity to the inner wall thereof. This bracket coöperates with the bearing 5 in supporting rock shafts 11 and 12 associated with the brake bands 7 and 8 respectively. The rock shafts 11 and 12 are arranged in parallelism and contiguous to the ends of the brake bands 7 and 8, and these rock shafts are adapted to be turned by any suitable or conventional form of operating mechanism (not shown) generally used upon motor driven vehicles.

13 and 14 denote sector gears on the shaft 11 and normally meshing with said gears are sector gears 15 and 16 on the shaft 12. The sector gears 13 and 15 are fixed to rotate with the shafts 11 and 12 respectively by pins 17 or other fastening means, and the gears 14 and 16 are loosely mounted upon said shafts. All of these gears are formed with peripheral spaced grooves 18 and lying in these grooves are links 20 pivotally attached at one end to the gears by pins or rivets 19. The opposite ends of the links 20 are pivotally connected to the ends of the bands 7 and 8 by pins or rivets 21 engaging eyes 22 on the ends of said bands. The links 20 are tangentially disposed relative to all of the gears and constitute a connection which permits of the turning of either pair of gears 13 and 16 or 14 and 15 to expand or contract said bands within the drum. The turning of each pair of gears in one direction spreads apart equally the ends of the band linked thereto, and a reverse motion brings said ends equally toward each other. A gradual even movement is imparted to both ends of the band equally and the band is therefore gradually expanded with an even force throughout its length into frictional contact with the drum.

It is through the medium of the sector gear arrangement that the shafts 11 and 12 are rocked to adjust one brake band independently of the other, consequently one brake band may be used as an emergency brake and the other as a service brake.

While the brake mechanism has been especially designed for vehicles, nevertheless, it is applicable to a hoisting apparatus, well drilling outfits, and various kinds of controlling devices.

What I claim is:—

1. The combination with a brake drum, of a brake band within the drum, a rotatable member within the drum adjacent to one end of the band provided with grooves, connecting members pivotally connected to the end of the band and extending into the grooves of said members with pivotal connections in said grooves to connect the band with the rotatable member tangentially to the path of movement of the pivotal connections of the connecting members with the rotatable member, and means for rotating the rotatable member.

2. In a brake mechanism, the combination with a drum, and brake bands therein, of parallel rock shafts extending into said drum, a set of gears on each rock shaft with one of said gears fixed to said shaft and the gears of one shaft meshing with the gears of the other shaft and means set in said gears and connecting said gears and the ends of said brake bands whereby one of said bands can be adjusted independently of the other band.

In testimony whereof I affix my signature in presence of two witnesses.

EMIL A. NELSON.

Witnesses:
  G. E. McGrann,
  L. E. Flanders.